May 7, 1929.  H. J. VAN DER BIJL  1,711,663
SYSTEM UTILIZING RADIANT ENERGY SENSITIVE DEVICE
Filed June 14, 1919  2 Sheets-Sheet 1
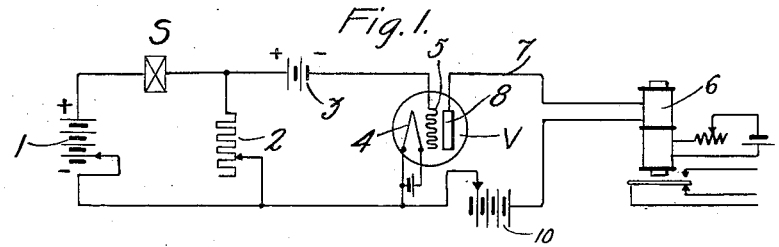
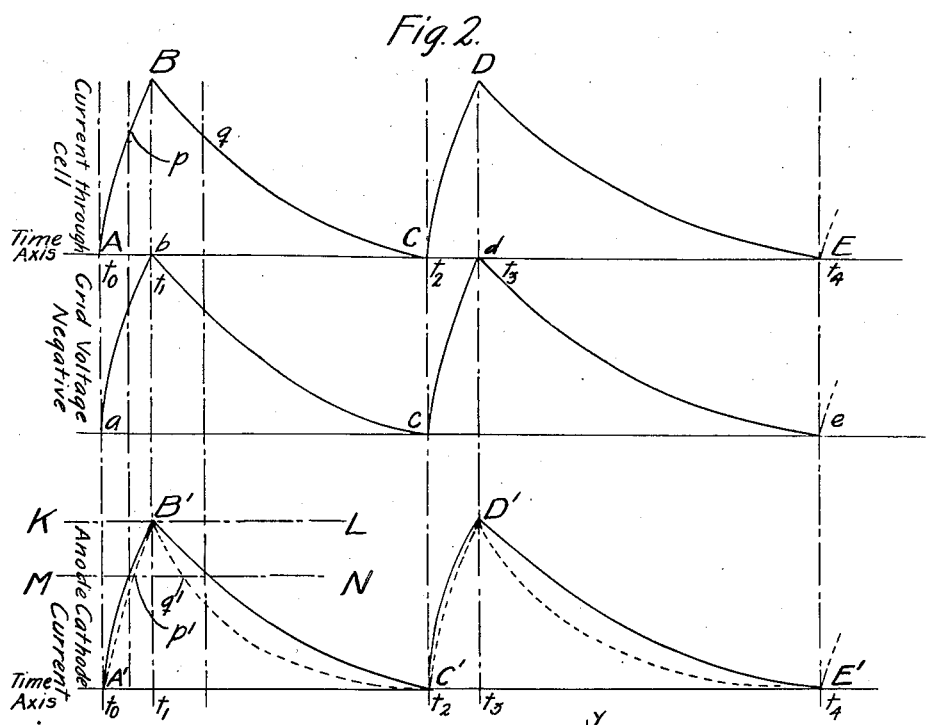
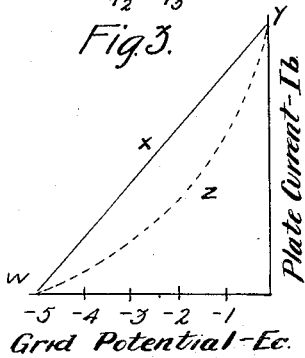
Inventor:
Hendrik J. Van der Bijl
by  Atty.

Inventor:
Hendrik J. Van der Bijl.
by J. G. Roberts Atty.

Patented May 7, 1929.

1,711,663

UNITED STATES PATENT OFFICE.

HENDRIK J. VAN DER BIJL, OF NEW YORK, N. Y., ASSIGNOR TO WESTERN ELECTRIC COMPANY, INCORPORATED, OF NEW YORK, N. Y., A CORPORATION OF NEW YORK.

SYSTEM UTILIZING RADIANT-ENERGY SENSITIVE DEVICE.

Application filed June 14, 1919. Serial No. 304,318.

This invention relates to electro-optical systems.

An object of the invention is to so associate an electrical device, whose changes of electrical characteristics lag behind impressed changes of external influence, with another electrical device which has no time lag, that the combination will be useful for the electrical transmission of intelligence and other purposes.

This invention relates especially to radiant energy sensitive devices of the type in which there is a considerable time lag, i. e. in which the complete change in resistance resulting from a change in the intensity of the radiant energy does not occur immediately but lags some little time beyond the change in intensity of the radiant energy. It is thus distinguished from devices wherein the response to a change in intensity of the impinging radiant energy is substantially instantaneous and complete, as for example, in photoelectric cells having light sensitive alkali earth metal cathodes.

Another object is to associate a device sensitive to radiant energy with an electronic discharge repeater or equivalent device in a manner whereby more efficient operation may be secured.

A specific object is to provide means for utilizing the curved characteristic of a suitable vacuum tube to distort the characteristic curve of a light sensitive device.

A more specific object of the invention is to provide means for associating selenium crystals or cells or equivalent radiant energy sensitive bodies or devices with one or more vacuum tubes or equivalent means so that the effective speed of working will be greater.

Figure 4:
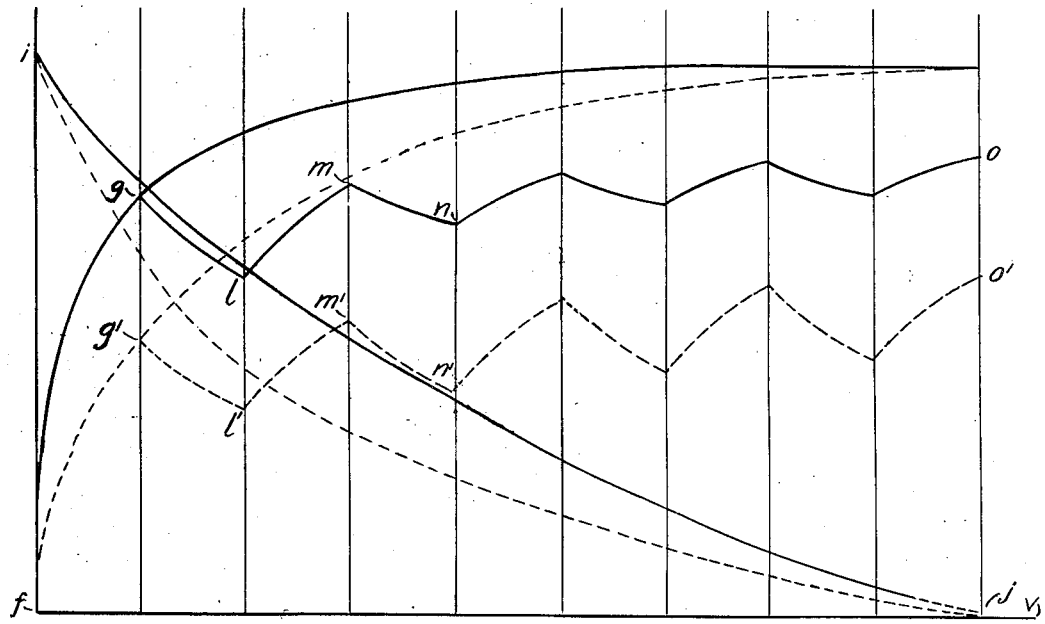
Figure 5:
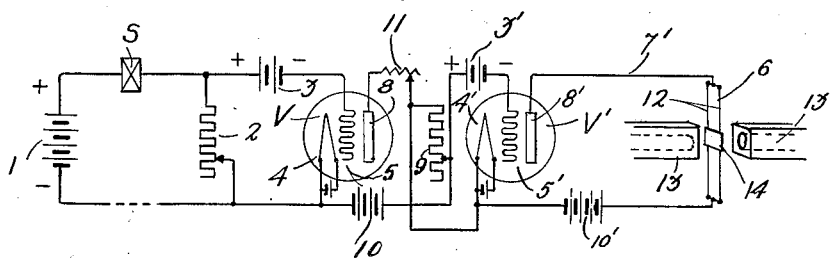

The invention, or one or more features thereof, may be variously applied in the practical arts, as for example in the device known as the optiphone and in phototelegraphy. The invention is herein explained in connection with the accompanying drawings wherein Fig. 1 shows a selenium crystal associated with a vacuum tube of the audion type; Figs. 2, 3 and 4 are plots of curves explanatory of the action of the device of Fig. 1; and Fig. 5 shows a manner of utilizing a plurality of vacuum tubes.

In Fig. 1, a battery 1 is arranged to pass current through a resistance 2 in series with a selenium cell S or equivalent radiant energy sensitive device. The resistance 2 is placed in series with battery 3 and is also in a series circuit between the cathode 4 and control electrode 5 of the three-element vacuum tube V. Increase of current through cell S and resistance 2 will decrease the negative potential on control electrode or grid 5 which constitutes a means to vary the internal impedance of tube V. A device 6, to be operated, may be associated with the circuit 7 between the anode 8 and cathode 4 in any suitable manner. In Fig. 1 the device 6 is illustrated as a conventional differential relay. Device 6 represents any receiving means or device to be controlled. Anode-cathode current is provided by battery 10.

Suppose the cell S is being alternately illumined for short times and darkened for longer times as indicated by the time axis in Fig. 2, where $t_0$—$t_1$ and $t_2$—$t_3$ represent illuminated periods, and $t_1$—$t_2$ and $t_3$—$t_4$ represent darkened periods. If the ordinates represent the current through resistance 2 and cell S, the current during illumination will be represented by portions of the curve AB, CD, etc., while portions BC and DE represent the current during the darkened periods. Portions AB, CD, etc., are much steeper than portions BC, DE, etc., so that under certain working conditions on the part of the characteristic of a selenium cell where the most rapid changes take place, the time $t_0$—$t_1$ may be 1/10 or 1/20 or even a less portion of the time $t_1$—$t_2$ if the resistance of the selenium is allowed to return to its original value. Now, suppose the resistance 2 is varied until at time $t_0$, at which there is minimum current through resistance 2, the negative potential of grid 5 is a maximum as represented by distance A$a$, while at times $t_1$ the negative potential is zero. Then, if the characteristic curve of vacuum tube V, plotted between grid potential $E_c$ and plate current $I_b$, were a straight line as $wxy$ (Fig. 3) the anode-cathode current through tube V and device 6 will be the full line curve A′ B′ C′ (Fig. 2, which will be of the same shape as curve ABC. Since, however, the characteristic of the tube is curved as shown by line $wzy$ (Fig. 3) the anode-cathode current will follow the dotted line curve A′ $p'$ B′ $q'$ C′ D′ E′ of Fig. 2. Furthermore, the nature of the selenium cell is such that if the illumination is cut off at a time when the current is at a point $p$, the ilcurrent curve will descend on a curve substantially parallel with the curve $qC$ while, if the cell is illuminated at a time when the current has reached the point $q$, the current will rise in accordance with a curve substantially parallel with the curve $pB$. Now, assume that it is desired to work with currents between a minimum, as shown by the height of line MN, and a maximum, as exemplified by line KL. Thus, for example, assume that the relay device 6 will pick up its armature at a maximum current KL and drop its armature at a current MN. This illustration of the manner of utilizing a maximum and minimum current for the specific purpose of operating a relay is understood to be illustrative only, and the application of the invention may be widely varied. The maximum and minimum points may be very close together or further apart, as operating conditions may determine. It will be seen that greater speed of operation may be attained with the arrangement of Fig. 1 than with a selenium device not associated with a repeater or other device having a curved characteristic. This is because curves $p'$ $B'$ and $B'$ $q'$ are not parallel to $pB$ and $Bq$. This gain will hold over the entire upper range of the curve ABCDE, for either large or small current changes. It will thus be seen that the same amplitude of current variation will be attained in less time.

Fig. 4 is arranged to explain the invention from a slightly different viewpoint, and to show how a greater amplitude of current variation may be obtained with a certain frequency of variation of illumination. If the abscissæ $fv$ represent time and ordinates, $ft$ represent either the current through the selenium device S, or in the output circuit of the vacuum tube repeater, on the assumption that the repeater has a linear characteristic, then the full line curve $fgh$ will represent the current if the device S, having been darkened, is illuminated for an indefinite time, and full line curve $ij$ represent the current if the device S, having been illuminated, is indefinitely darkened. Curve $fglmno$ will represent the current if the device S is being alternately illuminated and darkened for equal periods of time. Assuming, however, that the repeating device V has a decidedly curved characteristic, then the dotted lines $f$ $g'$ $h$ and $ij$ will represent the currents in the output circuit of the repeater corresponding respectively to the full line curves $fgh$ and $ij$. The dotted curve $fq'l'm'n'o'$ shows the current variations in the output circuit of the repeater corresponding to the curved characteristic. It will be noted that the amplitude of the current variations on the curve $g'l'o'$ will be considerably greater than those corresponding to the curve $glo$, etc. It is assumed of course that the last statement refers to the conditions corresponding to the state wherein the device S has been alternately darkened and illuminated for a considerable length of time, so that the current variations will repeat themselves over substantially the same range.

In general, the greater the curvature of the characteristic $wzy$, the more advantageous will be the operation for the purpose of increasing the speed of working. For this reason it may be desirable to use two or more vacuum tube repeaters in cascade, as indicated in Fig. 5 where the tube V feeds into a second tube V' having a generally similar arrangement of input and output circuits. The resistance 9 is so arranged that increased current therethrough will lower the negative potential of the grid 5. If desired, a variable control resistance 11 may be added so that the total value of output resistances 9 and 11 may be maintained constant, while resistance 9 is varied, or vice versa. The normal potential upon the grid 5 may thus be controlled. The grid of the second tube is connected to the filament of the first, and the filament of the second tube to the plate of the first as indicated. This reversed connection is necessary in order that the wave form of the current wave in the output circuit of the first tube may be further distorted by the second.

To further illustrate the possible practical application of the invention, the device 6 in Fig. 5 is shown in the form of a part of a known photo-telegraphic receiving device, such as is shown in the United States patent to Korn No. 888,098, May 19, 1908. With this arrangement the output current passes through the circuit 7' which includes wires 12. On the wires is mounted a small screen or shutter 14, the wires being stretched taut and located between the poles 13 of a magnet so that the shutter will be more or less displaced as more or less current respectively passes through the wires 12. For further description of such a receiving device the patent referred to may be consulted. In combination with such a receiving means the use of one or more vacuum tubes will have advantages in addition to that of greater operating speed owing to their amplifying power and curved characteristic, or both. When the received current is not a linear function of the intensity of illumination of the light sensitive transmitting device, a vacuum tube may be made to compensate for this by virtue of its non-linear characteristic. This is of special importance in the case of a selenium cell, since the increase in current through such a cell per unit change of light impinging thereon is not uniform for light of various intensities. The increase in current due to a given increase of illumination falls off rapidly as the intensity of illumination increases. Since with a vacuum tube having a decidedly curved characteristic, the variation in plate current is small for small changes in a small value of input voltage, but large for small changes in a large input voltage, the output current of the tube will, under proper conditions, be much more nearly a linear function of the intensity of illumination of the selenium cell than the current through the cell itself.

Without considering the amplifying effect of the tube V there will thus be a gain in the speed at which a light sensitive device of the selenium type or other devices having a similar time lag can be operated. Furthermore, the vacuum tube or series of vacuum tubes can easily be designed to produce a current amplification over its whole operating range which is an additional advantage, as smaller changes of current through the device S may be utilized. The tube V is therefore both a distorting relay and an amplifier. In practical applications it may be necessary to locate any one of the devices S, V or 6 at a station remote from one or more of the others, hence by connecting lines or circuits as defined herein are meant electrical conductors of any length including local or long distance telegraph, telephone or cable lines.

Novel features inherent in the invention are defined in the following claims.

What is claimed is:

1. In combination, a radiant energy sensitive device having a time lag, an electron discharge device having a curved input voltage and output-current characteristic, and associated circuits whereby the first of said devices feeds into the other of said devices, means to adjust said second named device for operation on a portion of its characteristic corresponding to negative input voltage only, and means responsive to variations in the amplitude of the space current of said discharge device produced by changes in the characteristic of said first device.

2. The combination of a radiant energy sensitive device and an electron discharge repeater having grid and anode circuits, said device being connected to the grid circuit of said repeater, the current through said device undergoing relatively rapid increase when said device is first energized by radiant energy and slower increase thereafter, said repeater being adjusted to have a decidedly non-linear relation between its grid circuit voltage and its anode circuit current whereby the slower increases of current have relatively greater effect in changing the amplitude of the current in said anode circuit than do the more rapid increases.

3. The combination in a control circuit of means sensitive to electromagnetic waves, said means being characterized by different rates of response to waves of increasing and decreasing amplitude, a space discharge tube to compensate for said different rates of response, said tube having a cathode, an anode and a control electrode, said control electrode being connected to said wave sensitive means and being negatively polarized, and a relay connected to said anode and cathode.

4. In combination an electric circuit, a selenium element therein, a source of radiant energy adapted to alter the conductance of said element, a source of electromotive force for producing a current proportional to the conductance of said element, an electron discharge device including input and output circuits, said electric circuit being directly conductively connected to the input circuit of said device, and a controlled element arranged to be affected by the output circuit of said device.

5. A reproducing amplifier comprising a bulb containing a filament and a grid, a circuit connecting the filament and grid and containing a source of potential and a light reactive cell, and means in shunt with the filament grid circuit for controlling the grid potential whereby uniform reproduction with light reactive cells of varying characteristics can be effected.

6. A reproducing amplifier comprising a bulb containing a filament and a grid, a circuit connecting the filament and grid and containing a source of potential and a light reactive cell, and means connected across the filament and grid for controlling the grid potential whereby uniform reproduction with light reactive cells of varying characteristics can be effected.

In witness whereof, I hereunto subscribe my name this 12th day of June A. D., 1919.

HENDRIK J. van der BIJL.